United States Patent
Lee et al.

(10) Patent No.: US 7,421,129 B2
(45) Date of Patent: Sep. 2, 2008

(54) IMAGE COMPRESSION AND SYNTHESIS FOR VIDEO EFFECTS

(75) Inventors: Ming-Chieh Lee, Bellevue, WA (US); Shou-Jen (Joseph) Wu, Redmond, WA (US); Sergey Smirnov, Redmond, WA (US); Brian D. Crites, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 833 days.

(21) Appl. No.: 10/656,301

(22) Filed: Sep. 4, 2003

(65) Prior Publication Data

US 2004/0131261 A1 Jul. 8, 2004

Related U.S. Application Data

(60) Provisional application No. 60/408,476, filed on Sep. 4, 2002.

(51) Int. Cl.
*G06K 9/36* (2006.01)
(52) U.S. Cl. .............. 382/232; 382/233; 382/298; 382/297
(58) Field of Classification Search ............... 386/52, 386/55; 382/232, 233, 297, 298; 348/722, 348/578, 586, 597, 590, 591, E9.056
See application file for complete search history.

(56) References Cited

U.S. PATENT DOCUMENTS

| | | | |
|---|---|---|---|
| 5,473,379 A | 12/1995 | Horne | |
| 5,617,144 A | 4/1997 | Lee | 375/240.16 |
| 5,657,087 A | 8/1997 | Jeong et al. | |
| 5,778,098 A | 7/1998 | Lee et al. | 382/236 |
| RE35,910 E | 9/1998 | Nagata et al. | 348/416.1 |
| 5,835,147 A | 11/1998 | Florentin et al. | |
| 5,929,902 A | 7/1999 | Kwok | 348/96 |
| 5,933,535 A | 8/1999 | Lee et al. | 382/243 |
| 5,970,173 A | 10/1999 | Lee et al. | 382/236 |
| 6,008,852 A | 12/1999 | Nakaya | |
| 6,037,988 A | 3/2000 | Gu et al. | 375/240.16 |
| 6,058,212 A | 5/2000 | Yokohama | 382/236 |
| 6,178,205 B1 | 1/2001 | Cheung et al. | 375/240.29 |
| 6,215,496 B1 | 4/2001 | Szeliski et al. | 345/419 |
| 6,369,835 B1 | 4/2002 | Lin | 715/726 |
| 6,392,705 B1 | 5/2002 | Chaddha | 348/388.1 |
| 6,400,831 B2 | 6/2002 | Lee et al. | |
| 6,546,188 B1 * | 4/2003 | Ishii et al. | 386/52 |
| 6,549,578 B1 | 4/2003 | Maruya et al. | |
| 6,594,313 B1 | 7/2003 | Hazra et al. | 375/240.16 |
| 6,650,705 B1 | 11/2003 | Vetro et al. | 375/240.08 |
| 6,707,854 B1 | 3/2004 | Bonnet et al. | |
| 6,728,317 B1 | 4/2004 | Demos | 375/240.21 |

(Continued)

OTHER PUBLICATIONS

ISO/IEC, ISO/IEC 11172-2, Information technology—Coding of moving pictures and associated audio for digital storage media at up to about 1,5 Mbit/s—Part 2: Video, 112 pp. (1993).

(Continued)

*Primary Examiner*—Anh Hong Do
(74) *Attorney, Agent, or Firm*—Klarquist Sparkman, LLP (57) ABSTRACT

An encoder compresses a set of still images and parameterizes (with effect parameters) additional images synthesized from the set of still images. A decoder decompresses the set of still images and synthesizes the additional images using the effect parameters.

38 Claims, 3 Drawing Sheets

U.S. PATENT DOCUMENTS

| | | | |
|---|---|---|---|
| 6,775,326 | B2 | 8/2004 | Sekiguchi et al. |
| 6,784,942 | B2 | 8/2004 | Selby et al. |
| 6,996,177 | B1 | 2/2006 | Beuker |
| 7,068,720 | B2 | 6/2006 | Wang et al. |
| 2003/0138150 | A1 | 7/2003 | Srinivasan et al. .......... 382/236 |
| 2003/0156646 | A1 | 8/2003 | Hsu et al. .................... 375/240 |
| 2004/0001705 | A1 | 1/2004 | Soupliotis et al. ........ 348/222.1 |
| 2005/0254584 | A1 | 11/2005 | Kim et al. .............. 375/240.27 |

OTHER PUBLICATIONS

Ebrahimi, "MPEG-4 Video Verification Model: A video encoding/decoding algorithm based on content representation," 30 pp. (1997).

ISO/IEC, "JTC1/SC29/WG11 N2202, Information Technology—Coding of Audio-Visual Objects: Visual, ISO/IEC 14496-2," 329 pp. (1998).

ITU-T, "ITU-T Recommendation H.261, Video Codec for Audiovisual Services at px64 kbits," 25 pp. (1993).

ITU-T, "ITU-T Recommendation H.262, Information Technology—Generic Coding of Moving Pictures and Associated Audio Information: Video," 205 pp. (1995).

ITU-T, "ITU-T Recommendation H.263, Video coding for low bit rate communication," 162 pp. (1998).

"JPEG Image Coding Standard," 23 pp. [Downloaded from the World Wide Web on Feb. 23, 2004.].

Wu et al., "Joint estimation of forward and backward motion vectors for interpolative prediction of video," *IEEE Transactions on Image Processing*, vol. 3, No. 5, pp. 684-687, Sep. 1994.

Reader, "History of MPEG Video Compression—Ver. 4.0," 99 pp., document marked Dec. 16, 2003.

Anandan et al., "Hierarchical Model-Based Motion Estimation," Kluwer Academic Publishers, Boston, pp. 1-22 (1993).

Avid Technology, Inc., materials downloaded from World Wide Web, 11 pp. (downloaded from World Wide Web on Feb. 18, 2005).

Barron et al., "Performance of Optical Flow Techniques," *IJCV*, vol. 12, No. 1, pp. 43-77 (1994).

Beauchemin et al., "The Computation of Optical Flow," *ACM Computing Surveys*, vol. 27, No. 3, pp. 433-467 (1995).

Bugwadia et al., "Progressive-Scan Rate Up-Conversion of 24/30 Hz Source Materials for HDTV," *IEEE Transactions on Consumer Electronics*, vol. 42, No. 3, pp. 312-321 (1996).

Cafforio et al., "Motion Compensated Image Interpolation," *IEEE Transactions on Communication*, vol. 38, No. 2, pp. 215-222 (1990).

Chang et al., "Simultaneous Motion Estimation and Segmentation," *IEEE Transactions on Image Processing*, vol. 6, No. 9, pp. 1326-1333 (1997).

DynaPel Systems, Inc., materials downloaded from World Wide Web, 20 pp. (downloaded from World Wide Web on Feb. 18, 2005).

Efstratiadis et al., "Motion Field Prediction and Restoration for Low Bit-Rate Video Coding," *Proc. 2nd International Conference on Image Processing (ICIP 95)*, 4 pp. (Oct. 1995).

Ghosal et al., "A Fast Scalable Algorithm for Discontinuous Optical Flow Estimation," *IEEE Transactions on Pattern Analysis and Machine Intelligence*, vol. 18, No. 2, pp. 181-194 (1996).

Guleryuz, "Iterated Denoising for Image Recovery," *IEEE*, 10 pp. (marked Apr. 2002).

Hendriks et al., "Recursive Disparity Estimation Algorithm for Real Time Stereoscopic Video Applications," *IEEE International Conference on Image Processing*, pp. 891-894 (Sep. 1996).

Horn et al., "Determining Optical Flow," *Artificial Intelligence*, pp. 185-203 (1980).

Kim et al., "Local motion-adaptive interpolation technique based on block matching algorithms," *Signal Processing: Image Communication*, vol. 4, pp. 519-528 (1992).

Krishnamurthy et al., "Frame Interpolation and Bidirectional Prediction of Video using Compactly-Encoded Optical Flow Fields and Label Fields," *IEEE Transactions for Circuits and Systems for Video Technology*, 30 pp. (1996).

Lucas et al., "An Iterative Image Registration Technique with an Application to Stereo Vision," *Proceedings of Imaging Understanding Workshop*, pp. 121-130 (1981).

Martins, "Real-time Video Frame Rate Adaptation Based on Warping of Edge-Preserving Meshes," *ICIP*, pp. 948-952 (1999).

Morimoto et al., "Automatic Digital Image Stabilization," *Proc. of IEEE International Conference on Pattern Recognition*, Vienna, Austria, 6 pp. (Aug. 1996).

Ribas-Corbera et al., "Interframe Interpolation of Cinematic Sequences," *Journal of Visual Communication and Image Representation*, vol. 4, No. 4, pp. 392-406 (1993).

Shum et al., "Panoramic Image Mosaics," Technical Report MSR-TR-97-23, 53 pp.

Simoncelli, "Bayesian Multi-Scale Differential Optical Flow," *Differential Formulation*, pp. 397-422 (1998).

Stiller et al., "Estimating Motion in Image Sensors, A tutorial on modeling and computation of 2D motion," *IEEE Signal Processing*, 36 pp. (1999).

Sullivan et al., "The H.264/AVC Advanced Video Coding Standard: Overview and Introduction to the Fidelity Range Extensions," 21 pp. (Aug. 2004).

Thoma et al., "Motion Compensating Interpolation Considering Covered and Uncovered Background," *Signal Processing: Image Communication*, vol. 1, pp. 191-212 (1989).

Tubaro et al., "Motion Field Estimators and their Application to Image Interpolation," *Motion Analysis and Image Sequence Processing*, Kluwer Academic Publishers, Chapter 6, pp. 153-187 (1993).

Zhang et al., "Piecewise linear motion-adaptive interpolation," *Signal Processing: Image Communication*, vol. 4, pp. 93-99 (1991).

\* cited by examiner

Figure 1

Software 180 Implementing Image Processing Techniques

IMAGE COMPRESSION AND SYNTHESIS FOR VIDEO EFFECTS

RELATED APPLICATION INFORMATION

This application claims the benefit of U.S. Provisional Patent Application Ser. No. 60/408,476, filed Sep. 4, 2002, the disclosure of which is incorporated herein by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates to processing of still images. For example, an encoder and decoder process a set of still images for video effects or other effects.

BACKGROUND

With the increasing popularity of digital cameras and digital video cameras, digital images and video have become commonplace. Companies and consumers increasingly depend on computers and computer networks to create, distribute, and play back digital image and video content.

Engineers use a variety of techniques to process digital images and video efficiently while still maintaining quality. To understand these techniques, it helps to understand how image and video information is represented and processed in a computer.

Digital images and digital video consume large amounts of storage and transmission capacity. A typical digital image can include tens or hundreds of thousands of pixels (also called pels). Each pixel represents a tiny element of the picture. In raw form, a computer commonly represents a pixel with 24 bits. A typical video sequence includes 15 or 30 frames per second. Thus, the number of bits per second, or bitrate, of a typical raw digital video sequence can be 5 million bits/second or more.

Many computers and computer networks lack the resources to process raw digital images and video. For this reason, engineers use compression (also called coding or encoding) to reduce the bitrate of digital images and video. Compression can be lossless, in which quality of the images or video does not suffer, but decreases in bitrate are limited by the complexity of the images or video. Or, compression can be lossy, in which quality of the images or video suffers, but decreases in bitrate are more dramatic in subsequent lossless compression. Decompression reverses compression.

In general, image compression techniques are sometimes called intraframe compression techniques. Intraframe compression techniques compress individual images, which are typically called I-frames, key frames, or reference frames when the frames are in a video sequence. Video compression techniques include intraframe compression and interframe compression. Interframe compression techniques compress frames with reference to preceding and/or following frames, and inter-coded frames are typically called predicted frames, P-frames, or B-frames.

For still image compression, well-known intraframe compression standards or products include the various versions of Joint Picture Expert Group ["JPEG"] standards. For compression of I-frames in video, well-known intraframe compression standards or products include the various versions of the Motion Picture Expert Group ["MPEG"] standards, the various H.26x standards from the International Telecommunications Union, and various versions of Windows Media Video ["WMV"] products from Microsoft Corporation. In addition to describing intraframe compression of video frames, the MPEG 4 standard describes encoding and decoding of "sprites," which are pictures that may be warped in whole or in part for reconstruction at a particular time.

Outside of the area of compression/decompression, various image processing tools allow a user to add effects to still images. When editing an image or series of images (e.g., for a slide show), a user may add effects such as fading, blending, zooming, panning, or rotation. (Fading is essentially blending between an actual image and a blank image.) The effects are presented in images synthesized from the original image or series of images. The entire sequence of original and synthesized images, which is sometimes called a vivid video sequence, may be recorded for distribution and later playback.

Still image compression and video compression successfully reduce the bitrate of still image files for many applications. These forms of compression, however, do not provide adequate performance for vivid video sequences.

SUMMARY

In summary, the detailed description is directed to various techniques and tools for processing sets of still images. For example, an encoder processes a set of still images for video effects or other effects, efficiently encoding high-resolution still images and motion information to deliver a high-quality sequence of images to a decoder at a low bitrate. The various techniques and tools can be used in combination or independently.

According to a first aspect of the techniques and tools described herein, an encoder gets effect parameters for synthesized images derived from original still images. For example, the parameters include affine coefficients for panning, zooming and/or rotation effects, or the parameters include fading coefficients for fading or blending effects. The encoder compresses the original still images, and then outputs the effect parameters and compressed original still images. In this way, the encoder can produce high-quality output for a sequence of vivid video, which is suitable for delivery by streaming over low bitrate connections.

According to a second aspect of the techniques and tools described herein, a decoder receives compressed original still images and effect parameters for synthesized images. The decoder decompresses the still images. The decoder then composes the synthesized images based upon the effect parameters and the decompressed still images. For example, the decoder computes component images based upon the effect parameters and the decompressed images, and then combines the component images for a synthesized image. In this way, the decoder can produce a high-quality sequence of vivid video from a file streamed over a low bitrate connection.

The various features and advantages of the invention will be made apparent from the following detailed description of embodiments that proceeds with reference to the accompanying drawings.

DETAILED DESCRIPTION

Described embodiments of the present invention are directed to techniques and tools for processing still images, enriching the scope and functionality of computers as media devices.

In some embodiments, an encoder and decoder make presentation of a still image file more compelling by adding effects such as panning, zooming, rotation, and fading to the still image file. As a result, the still image file is presented more like a vivid video. Alternatively, the encoder and decoder use other and/or additional effects.

In some embodiments, the encoder makes delivery of a still image file with added effects more compelling by applying compression to the file. The encoder applies intra-frame compression to one or more still images of the file. The encoder parameterizes transforms and other information for the effects, using a compact representation for such information. As a result, the bitrate of the file is reduced to a degree that facilitates streaming, downloading, or file transfer of high-quality still image files with effects over low bitrate connections.

In some embodiments, the decoder makes playback of a still image file with added effects more compelling by applying decompression and synthesis to the file. The decoder applies intra-frame decompression to one or more still images of the file. The decoder decodes information for effects and uses the information to synthesize additional images.

In some embodiments, the encoder and decoder use affine transformation parameters to specify effects such as panning/translation, rotation, and zooming in synthesized images. In alternative embodiments, the encoder and decoder use another motion model.

The described techniques and tools complement existing media technologies for audio and video. In some embodiments, an encoder or decoder uses the described techniques in combination with audio and/or video for an enriched multimedia experience.

While the techniques are described in places herein as part of a single, integrated system, the techniques can be applied separately, potentially in combination with other techniques. In alternative embodiments, a tool other than an encoder or decoder implements one or more of the techniques.

In described embodiments, the encoder and decoder perform various techniques. Although the operations for these techniques are typically described in a particular, sequential order for the sake of presentation, it should be understood that this manner of description encompasses minor rearrangements in the order of operations, unless a particular ordering is required. For example, operations described sequentially may in some cases be rearranged or performed concurrently. Moreover, for the sake of simplicity, flowcharts typically do not show the various ways in which particular techniques can be used in conjunction with other techniques.

I. Computing Environment

Figure 1:
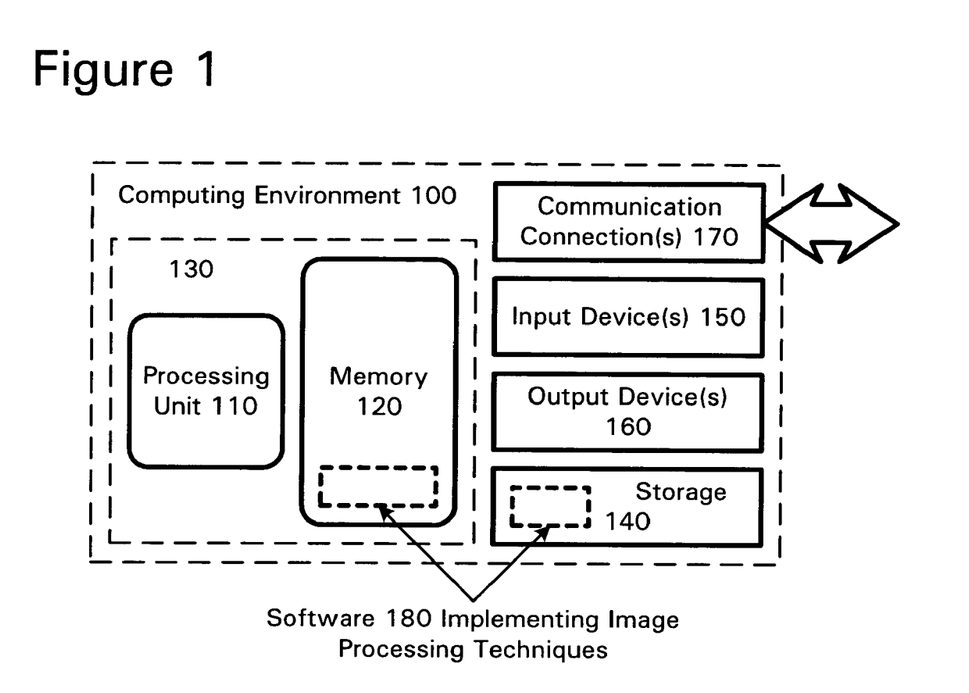
FIG. 1 is a block diagram of a suitable computing environment in which described embodiments may be implemented.

FIG. 1 illustrates a generalized example of a suitable computing environment (100) in which described embodiments may be implemented. The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory, etc.), or some combination of the two. The memory (120) stores software (180) implementing the image processing techniques of one or more described embodiments.

A computing environment may have additional features. For example, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and includes magnetic disks, magnetic tapes or cassettes, CD-ROMs, CD-RWs, DVDs, or any other medium which can be used to store information and which can be accessed within the computing environment (100). The storage (140) stores instructions for the software (180) implementing the image processing techniques of one or more described embodiments.

The input device(s) (150) may be a touch input device such as a keyboard, mouse, pen, or trackball, a voice input device, a scanning device, network adapter, or another device that provides input to the computing environment (100). For video or still images, the input device(s) (150) may be a TV tuner card, digital camera interface, video camera interface, or similar device that accepts video and/or still image input in analog or digital form, or a CD-ROM/DVD/disk reader that provides video or still images to the computing environment (100). The output device(s) (160) may be a display, printer, speaker, CD/DVD writer, network adapter, or another device that provides output from the computing environment (100).

The communication connection(s) (170) enable communication over a communication medium to another computing entity. The communication medium conveys information such as computer-executable instructions, compressed video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The invention can be described in the general context of computer-readable media. Computer-readable media are any available media that can be accessed within a computing environment. By way of example, and not limitation, with the computing environment (100), computer-readable media include memory (120), storage (140), communication media, and combinations of any of the above.

The invention can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

II. Example Encoder and Decoder

Figure 2:
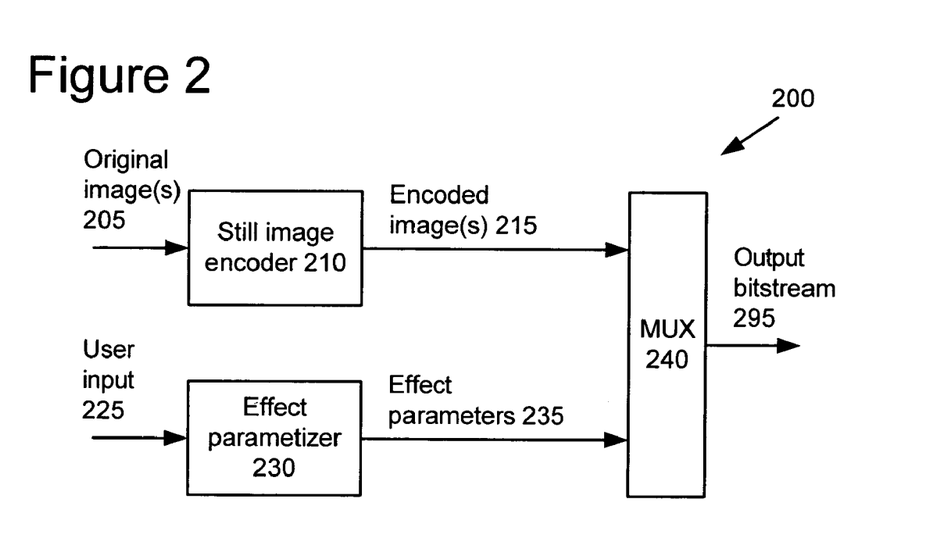
FIG. 2 is a block diagram of an encoder in which described embodiments may be implemented.
Figure 3:
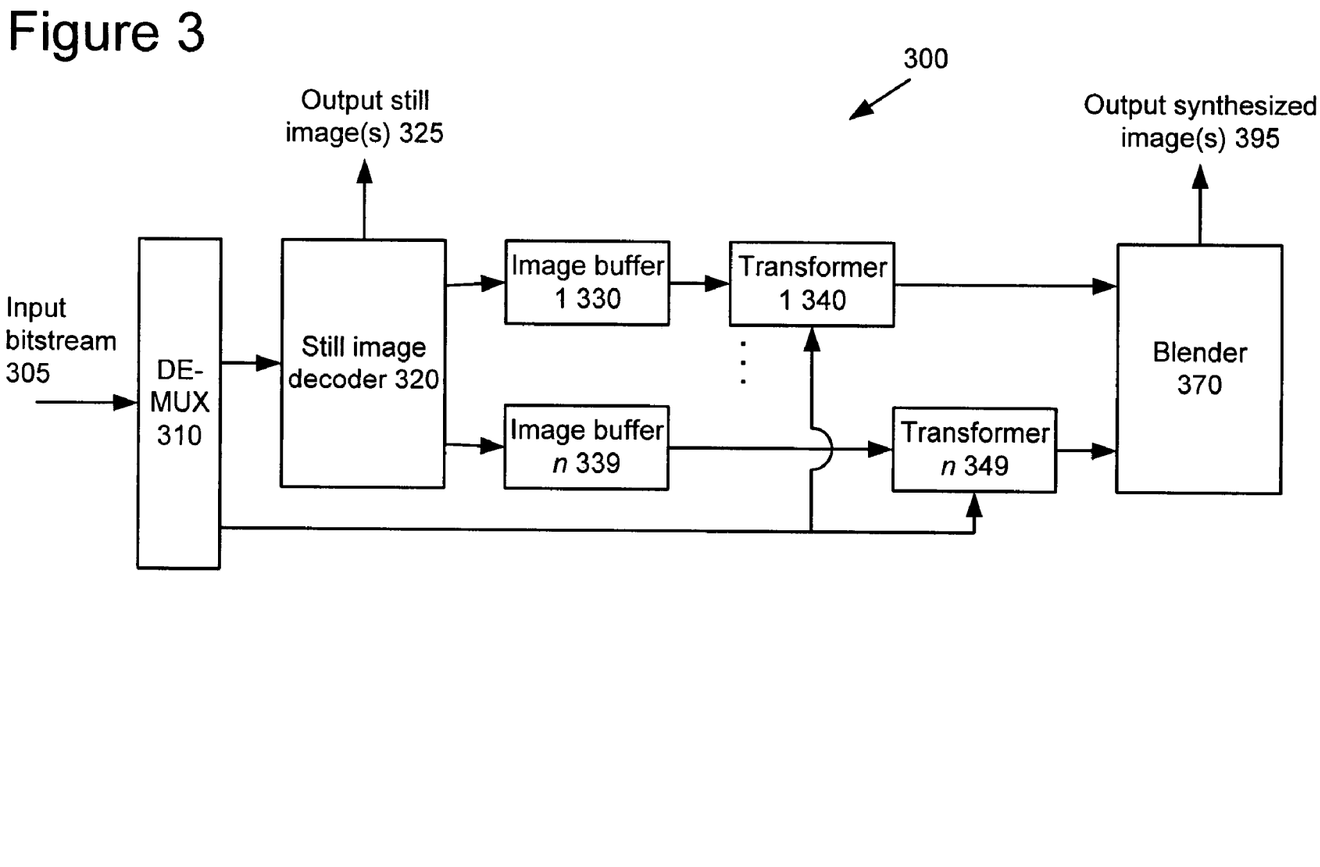
FIG. 3 is a block diagram of a decoder in which described embodiments may be implemented.

FIG. 2 is a block diagram of a generalized encoder (200) in which some described embodiments may be implemented. The encoder (200) processes still images during encoding and facilitates parameterization of the transforms for synthesized images. FIG. 3 is a block diagram of a generalized decoder (300) in which some described embodiments may be implemented. The decoder (300) processes still images during decoding and synthesizes images based upon transform parameters.

The relationships shown between modules within the encoder and decoder indicate the main flow of information in the encoder and decoder; other relationships are not shown for the sake of simplicity. Depending on implementation and the type of compression desired, modules of the encoder or decoder can be added, omitted, split into multiple modules, combined with other modules, and/or replaced with like modules. In alternative embodiments, encoders or decoders with different modules, other configurations, and/or different inputs or outputs process still images for compression/decompression and synthesis.

The encoder (200) and decoder (300) combine image compression/decompression technology and image synthesis technology to present a sequence of images with vivid transformations and transitions. The encoder (200) and decoder (300) use standard intra-frame compression and decompression for still images, and use generic affine transforms for the transformations and transitions. Alternatively, an encoder and decoder use other compression and decompression and/or use another motion model to parameterize effects.

From the end user's perspective, the output stream (295) of the encoder (200) is similar to a compressed video stream. The output stream (295) has I-frames and P-frames. The I-frames are compressed still images, much like intra-compressed video frames. The P-frames are sets of affine transform coefficients and other parameters for effects, which are interpreted by the decoder (300) to synthesize images. In some implementations, the encoder (200) is part of a video encoder, the decoder (300) is part of a video decoder, and the output bitstream (295) is formatted as a compressed video stream.

In a conventional video encoder, a P-frame is predicted from the previous frame, which is itself an I-frame or a P-frame. In contrast, in some implementations, the encoder (200) predicts a P-frame from one or more I-frames. The encoder (200) avoids P-frame to P-frame dependencies for several reasons in these implementations. First, fading/blending between two frames works best with two original frames. Second, always predicting from I-frames avoids error accumulation issues that conventional video encoders typically must address for P-frames. Third, post-authoring frame rate adjustment is enabled. (If P-frames depended on previous P-frames, removing a P-frame would effectively remove the P-frames that follow and refer to it, preventing effective post-authoring frame rate adjustment.) In alternative implementations, the encoder (200) predicts P-frames from either I-frames or other P-frames.

A conventional video encoder performs motion estimation or other motion analysis to determine motion information for P-frames. In contrast, the encoder (200) does not perform such analysis because motion information is provided at the user layer and/or application layer, or is derived from information provided at the user layer and/or application layer. This simplifies and speeds up the creation of the motion information, compared to conventional video encoders. For example, a user sets a "start" rectangle in an original still image, sets an "end" rectangle in the image, and sets a number of frames between the start and end rectangles. With these settings, the software "zooms in" on part of the still image, or "pans" from one part of the image to another part of the image, recording the zooming or panning effect in a series of images. A user similarly may set a number of frames to fade from the still image to black, or to transition to another still image. Thus, the user may zoom in on an object in the still image over 30 frames, then pan to the right for 60 frames, then fade to black (or cross between two still images) over 45 frames.

In some implementations, the encoder (200) and decoder (300) work with two sets of images. The images in one set have the dimensions of the original (source) content. The images in the other set have the dimensions of the target view window area, which is smaller. To display an original still image, the decoder (300) scales or crops the image to the target view window. For a synthesized image, the decoder (300) computes pixel values for locations in the target view window. The view area dimensions are stored in a specific area of the header of the output bitstream (295).

A. Example Encoder

The encoder (200) includes a still image encoder (210), an effect parametizer (230), and a multiplexer ["MUX"] (240).

The encoder (200) receives a set of one or more original still images (205) and user input (225) in some form indicating the parameters for effects such as transforms. The encoder produces an output bitstream (295). Particular embodiments of encoders typically use a variation or supplemented version of the example encoder (200).

The still image encoder (210) applies intra-frame compression to the set of one or more original still images (205). In some implementations, the still image encoder (210) performs a block-based frequency transform, quantization, and entropy encoding. The still image encoder (210) may use a version of JPEG compression, MPEG, H.26x, WMV I-frame compression, or some other still image or intra-frame compression technique. For additional detail about the still image encoder (210) in some embodiments, see U.S. patent application Ser. No. 09/849,502, entitled, "DYNAMIC FILTERING FOR LOSSY COMPRESSION," filed May 3, 2001, now U.S. Patent Publication No. US-2002-0186890-A1, the disclosure of which is hereby incorporated by reference.

The still image encoder (210) generates output that is, for example, constant bitrate/variable quality or variable bitrate/constant quality. In some implementations, the still image encoder (210) performs intra-frame compression in one pass, favoring speed. In other implementations, the still image encoder (210) performs intra-frame compression in multiple passes, favoring compression efficiency.

The still image encoder (210) produces one or more encoded images (215), which are output to the MUX (240) for further formatting in the output bitstream (295).

The effect parametizer (230) receives user input (225) and produces effect parameters (235) for one or more synthesized images. For example, the user input provides exact specification of the effect parameters (235) by a user. Or, the effect parametizer (230) converts input (such as application, session, and/or image settings as well as other input from the user) to the effect parameters (235). For example, on a frame-by-frame basis, as part of a frame header, application software provides the effect parameters (235) and other image information (such as pixels) to the encoder (200) through an interface.

The effect parameters (235) include motion transformation parameters, fading parameters, and/or parameters for other effects. For motion transformations like panning, rotation, and zooming, the effect parameters (235) include affine transform coefficients or parameters according to some other motion model. For transition effects such as fading (including cross-fading/blending between images), the effect parameters (235) include fading coefficients.

The effect parametizer (230) may encode the effect parameters (235) to reduce bitrate associated with the effect parameters, for example, as described in section III. The effect parametizer (230) then outputs the effect parameters (235) to the MUX (240).

The MUX (240) multiplexes and formats the information received from the other modules of the encoder (200). The MUX (240) outputs the output bitstream (295) in a format that a decoder recognizes. For example, the format is an image or video stream in a WMV format. In some implementations, the format is a multimedia format, so the MUX (240) can also include other multimedia streams such as audio tracks for voice or music in the output bitstream (295).

B. Example Decoder

With reference to FIG. 3, the decoder (300) includes a demultiplexer ["DEMUX"] (310), a still image decoder (320), one or more image buffers (330 . . . 339), one or more transformers (340 . . . 349), and a blender (370).

The decoder (300) receives an input bitstream (305) including a compressed still image file with effects. The decoder (300) decompresses the file and plays back one or more output still images (325) and/or one or more output synthesized images (395). Particular embodiments of decoders typically use a variation or supplemented version of the example decoder (300).

The DEMUX (310) parses information in the bitstream (305) and sends information to the modules of the decoder (300). Specifically, the DEMUX (310) sends encoded still image data to the still image decoder (320) and effect parameters to the respective transformers (340 . . . 349).

The still image decoder (320) applies intra-frame decompression to the encoded still image data to reconstruct one or more of the original still images (205). In some implementations, the still image decoder (320) performs entropy decoding, inverse quantization, and a block-based inverse frequency transform. The still image decoder (320) may use a version of JPEG decompression, MPEG, H.26x, WMV I-frame decompression, or some other still image or intra-frame decompression technique.

The still image decoder (320) may output one or more still images (325) at selected positions in a sequence or if directed by the user. In some implementations, the decoder (300) includes one or more additional modules for color conversion, post-processing, rendering, etc. (not shown). These modules may perform further processing on output images, for example, to scale or crop the output images to the dimensions of the target view window area.

Each of the one or more image buffers (330 . . . 339) stores a decoded still image. If all of the buffers (330 . . . 339) already store decoded still images when a new image is decoded, a picture (e.g., the oldest picture) is discarded. In one implementation, the decoder (300) includes two image buffers, but the decoder (300) can include more or fewer image buffers. Optionally, the decoder (300) applies de-blocking post-processing to a decoded image before storing the image in one of the image buffers (330 . . . 339).

The decoder (300) decodes (if necessary) the effect parameters to be applied to one of the decoded images in the one or more image buffers (330 . . . 339). Using the effect parameters, a given one of the one or more transformers (340 . . . 349) applies the transforms and/or other effects to a decoded still image stored in a corresponding image buffer. In one implementation, the decoder (300) includes two transformers, but the decoder (300) can include more or fewer transformers.

A given synthesized image may depend on data from any combination of the one or more decoded images stored in the one or more image buffers (330 . . . 339), as described by the transform parameters and determined by the respective transformers (340 . . . 349). Or, in some cases, a synthesized image may depend on un-transformed decoded image data as well.

The blender (370) combines multiple component images (e.g., images computed using the transform parameters and the decoded images) for a synthesized image. For example, the blender (370) applies a blending function to proportionally weight the component images.

The blender (370) outputs a synthesized image (395) at selected positions in a sequence or if directed by the user. In some implementations, the one or more additional modules for color conversion, post-processing, rendering, etc. may then perform further processing on the output image, for example, to scale or crop the output image to the dimensions of the target view window area (if the decoder (300) did not compute pixels values only for pixels at locations in the target view window area).

III. Example Encoder Implementation

Figure 4:
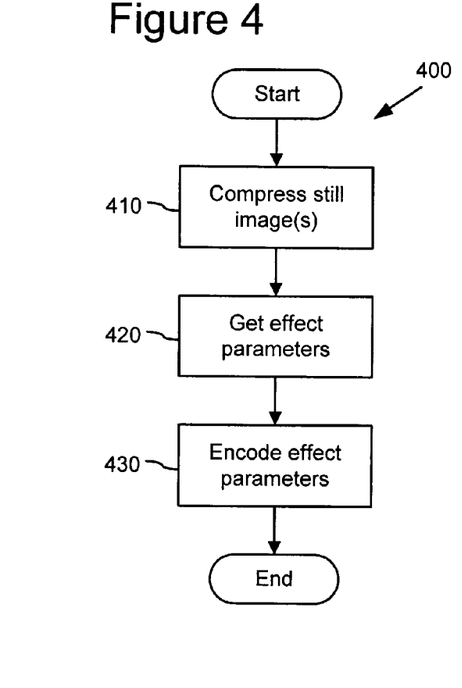
FIG. 4 is a flowchart showing a generalized technique for adding effects to a still image file and compressing the file with the effects.

In some embodiments, an encoder such as the encoder (200) of FIG. 2 adds effects to a still image file and compresses the still image file with the effects. FIG. 4 shows a generalized technique (400) for adding effects to a still image file and compressing the file with the effects.

The encoder compresses (410) one or more still images of a still image file. For example, the encoder uses a technique performed by the still image encoder (210) described the section II.

Aside from the compression of the still images, the encoder also gets (420) effect parameters. Typically, these parameters are specified at the user level and/or application level, or are derived from input at the user level and/or application level. In other words, the encoder does not derive the effect parameters from motion estimation or other comparison of synthesized images to still images to detect and parameterize changes. For example, the encoder uses a technique performed by the effect parametizer (230) described the section II.

In some implementations, the effect parameters for motion transformations are affine coefficients. The details of a conventional affine transformation can be explained in the following formula.

$$\begin{pmatrix} X_o \\ Y_o \\ 1 \end{pmatrix} = \begin{pmatrix} A & B & C \\ D & E & F \\ 0 & 0 & 1 \end{pmatrix} \times \begin{pmatrix} X_S \\ Y_S \\ 1 \end{pmatrix}, \quad (1)$$

where A, B, C, D, E, and F are the full set of affine coefficients for a generic affine transformation, where $X_S$ and $Y_S$ indicate a location in a synthesized image, and where $X_O$ and $Y_O$ indicate a location in an original still image. $X_O$ and $Y_O$ may indicate a fractional location, in which case bilinear interpolation is used to determine the pixel value at $X_S$ and $Y_S$ in the synthesized frame. A generic affine transformation can be used to parameterize panning, general translations, zooming, rotation, skewing, and mirroring. Using subsets of the full set of affine coefficients, the encoder can parameterize a subset of the operations. For example, the C and F coefficients alone can be used to parameterize translations.

After getting (420) effect parameters, the encoder then encodes (430) the effect parameters. This helps to reduce the bitrate of the effect parameters by signaling when less than the full set of potential parameters is used for a synthesized image. Alternatively, the encoder may also exploit patterns of redundancy or probability distributions in the effect parameters in compression of the effect parameters.

In some implementations, the encoder encodes affine transform coefficients and other effect coefficients for a particular P-frame/synthesized image as follows. The encoder uses up to fourteen coefficients for each P-frame. The encoder uses any combination of several different mechanisms to reduce the number of coefficients the encoder needs to transmit for the P-frame in different cases.

First, the encoder sets an affine coefficient mode for the P-frame (alternatively, at some other level such as sequence in the bitstream syntax). The encoder uses 2 bits to represent which of four different coefficient modes are used for affine transform coefficients, as shown in Table 1. Alternatively, the encoder uses more or fewer bits in fixed or variable length codes to represent a different number of coefficient modes (e.g., different sub-combinations of affine coefficients).

TABLE 1

Coefficient modes in some implementations

| Code | Meaning |
|------|---------|
| 00 | Translation only; encode affine coefficients C and F. |
| 01 | Translation and some zooming; encode affine coefficients A, C, and F. |
| 10 | Translation and full zooming; encode affine coefficients A, C, E, and F. |
| 11 | Generic affine; encode affine coefficients A, B, C, D, E, and F. |

Second, the encoder uses a flag bit to signal whether the P-frame (alternatively, some other level in the bitstream syntax) includes any fading coefficients for fading/blending effects. If so, the fading coefficients follow. Similarly, the encoder can use additional flags to signal whether a bitstream includes parameters for other effects.

Third, the encoder uses signaling bits to indicate how many sets of coefficients are transmitted for the P-frame (alternatively, some other level in the bitstream syntax). The number of sets depends on the number of still images to which effect parameters will be applied in order to contribute to the P-frame. As noted above, in some implementations, the encoder uses one or two still images to create a P-frame. In such implementations, up to two sets of coefficients are encoded per P-frame, one set describing how the target P-frame uses the most recent I-frame, and the other set describing how the target P-frame uses the second most recent I-frame. Alternatively, the encoder uses more sets of coefficients and/or sets of coefficients for different positions of I-frames relative to the target P-frame.

Coefficients themselves are sent as fixed length values such as those for a floating point representation. Alternatively, the coefficients are sent in some other fixed or variable length format.

IV. Example Decoder Implementation

Figure 5:
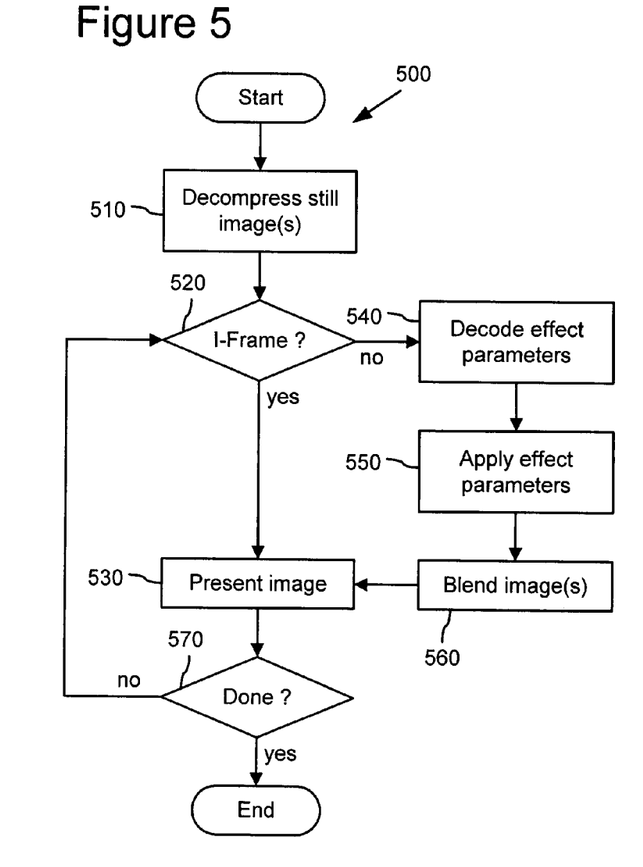
FIG. 5 is a flowchart showing a generalized technique for decompressing a still image file with added effects and playing back images.

In some embodiments, a decoder such as the decoder (300) of FIG. 3 decompresses a still image file with added effects and plays back images at different positions. FIG. 5 shows a generalized technique (500) for decompressing a still image file with added effects and playing back images.

Initially, the decoder gets picture dimensions for I-frames and/or P-frames from the bitstream header (alternatively, from some other level in the bitstream syntax). In implementations that work with two sets of images, the decoder gets the dimensions for the original pictures as well as the target view window dimensions. The decoder then initializes still image decoder modules with the original picture dimensions and initializes modules for post-processing, rendering, etc. with the target view window dimensions.

The decoder decompresses (510) one or more encoded still images of a still image file. For example, the decoder uses a technique performed by the still image decoder (320) described the section II. The decoder may decompress all still images in the file. Or, at a particular time, the decoder may decompress only still images in selected positions according to a pre-determined or changing playback order.

The decoder then checks (520) whether a frame to be played back is an I-frame or a P-frame. If the frame is an I-frame, the decoder presents (530) the decoded still image for the I-frame. For example, one or more modules in the decoder perform color conversion, post-processing, rendering, or other processing of the output image to scale or crop the output image to the dimensions of the target view window area.

On the other hand, if the frame to be played back is a P-frame, the decoder decodes (540) one or more sets of effect parameters for the P-frame. For example, the decoder parses the bitstream to retrieve parameters such as those described in Section III or parameters according to some other implementation.

The decoder then applies (550) the one or more sets of effect parameters to one or more still images. For example, the decoder applies a set of affine transform coefficients, fading coefficients, and/or other effect parameters to determine pixel values in each of one or more decoded still images.

The decoder then blends (560) component images for the P-frame into a combined, synthesized image. The component images result from applying the transformations to decoded still images or are the original still images. The blending function depends on implementation. In implementations in which the decoder blends (560) two component images, the blending function is:

$$\vec{P}_{new} = \alpha_1 \times \text{transform}(\vec{P}1_{old}) + \alpha_2 \times \text{transform}(\vec{P}2_{old}) \quad (2),$$

where $\vec{P}1_{old}$ and $\vec{P}2_{old}$ are images for the two component images, $\vec{P}_{new}$ is the resulting combined image, transform( ) represents the transform function(s), and $\alpha_1$ and $\alpha_2$ are weighting coefficients such that:

$$\alpha_1 + \alpha_2 = 1 \quad (3).$$

Alternatively, the decoder uses another blending function.

The decoder then presents (530) the synthesized image for the P-frame. For example, one or more modules in the decoder perform color conversion, post-processing, rendering, or other processing of the output image.

In some implementations, the decoder monitors the decoding time for frames. The decoder may drop one or more frames if decoding time (e.g., decompression time for an I-frame; for a P-frame, decompression time for I-frame(s) plus transform and blending time) is too long. For example, the decoder skips a frame if the decoding time of the previous frame is too long.

V. Example Frame Header Implementation

In some embodiments, an encoder such as the encoder (200) of FIG. 2 uses a particular frame header definition for a frame header of a frame for a still image file with added effects. Table 2 shows a frame header definition in some implementations. Alternatively, the encoder and decoder use another frame header definition.

TABLE 2

Frame header definition in some implementations

| | |
|---|---|
| Int CWMVideoObjectEncoder::EncodeSprite ( | |
| Bool | bNewKeyFrame, |
| BITMAPINFOHEADER* pbih, | |
| const U8 | *pdibPtr, |
| Int | iQuality, |
| Int | dwNumMotionVectorSets, |
| Float | fltA1, |
| Float | fltB1, |
| Float | fltC1, |
| Float | fltD1, |
| Float | fltE1, |
| Float | fltF1, |
| Float | fltFading1, |
| Float | fltA2, |
| Float | fltB2, |
| Float | fltC2, |
| Float | fltD2, |

TABLE 2-continued

Frame header definition in some implementations

| | |
|---|---|
| Float | fltE2, |
| Float | fltF2, |
| Float | fltFading2, |
| Char | *pcFrameEncodedBits, |
| UInt | *dwFrameLen, |
| Time | tTimeStamp) |

The frame header generally inherits the fields of a sprite type object and includes the following additional fields as well. The field bNewKeyFrame is a boolean value indicating whether the field pbih is for a valid compressed image (i.e., I-frame) or not. The field pbih is pointer to a structure of type BITMAPINFOHEADER that includes data describing an image, for example, image size, pixel bit depth, compression type, etc. The field pdibPtr is a pointer that points to the actual image data. The field iQuality indicates the quality of a compressed image (in some implementations, the valid range is 0 to 100, with 100 indicating the best quality).

The field dwNumMotionVectorSets indicates how many valid sets of effect parameters (e.g., transform and/or fading/blending coefficients) are available. In some implementations, the decoder buffers the last two decoded still images for subsequent P-frame operations. So, dwNumMotionVectorSets is 1 or 2.

The frame header then includes various floating point values for transform coefficients.

The field pcFrameEncodedBits is a pointer to an output buffer to receive compressed data. The field dwFrameLen is a pointer to a dword to receive the output data length. Finally, the field tTimeStamp is a time stamp for the frame, which indicates, for example, the position of the frame in a sequence.

VI. Example Alternative Embodiments

In several places, the previous sections mention the possibility of alternative embodiments. A few example alternative embodiments follow.

Several previous sections discuss affine transform parameters, but indicate that the encoder and decoder may use another motion model. For example, the other motion model uses a perspective transform.

Section V provides an example frame header definition, but indicates that other frame header definitions may be used. For example, Table 3 shows an alternative frame definition according to one implementation.

TABLE 3

Alternative frame header definition in some implementations

| | |
|---|---|
| #ifndef__PHOTOMOTION__H__ | |
| #define__PHOTOMOTION__H__ | |
| EXTERN__GUID(MEDIASUBTYPE__PHOTOMOTION, | |
| 0x1d4a45f2, 0xe5f6, 0x4b44, 0x83, 0x88, 0xf0, 0xae, 0x5c, 0x0e, 0x0c, 0x37); | |
| // dwControlFlags | |
| #define WM__PHOTOMOTION__SAMPLE__INPUT__FRAME | 1 // |
| sample has input frame | |
| #define WM__PHOTOMOTION__SAMPLE__OUTPUT__FRAME | 2 // |
| sample produces output frame | |
| #define WM__PHOTOMOTION__SAMPLE__USES__CURRENT__INPUT__FRAME | 4 |
| #define WM__PHOTOMOTION__SAMPLE__USES__PREVIOUS__INPUT__FRAME | 8 |
| // dwInputFlags | |
| #define WM__PHOTOMOTION__SAMPLE__MOTION | 1 // acef used (includes resizing) |

TABLE 3-continued

Alternative frame header definition in some implementations

```
#define WM_PHOTOMOTION_SAMPLE_ROTATION         2 // bd also used (not valid
without acef)
#define WM_PHOTOMOTION_SAMPLE_BLENDING         4 // BlendCoef1 used
#define WM_PHOTOMOTION_SAMPLE_ADV_BLENDING 8 // BlendCoef2 also used
(not valid without BlendCoef1)
#define WM_PHOTOMOTION_INTEGER_DENOMINATOR 65536L
#define WM_PHOTOMOTION_MAGIC_NUMBER 0x1d4a45f2
typedef struct _WMPhotoMotionSample {
    DWORD dwMagic;
    ULONG cbStruct; // size of structure; incudes dwMagic and cbStruct
    DWORD dwControlFlags;
    // most recent input frame
    DWORD dwInputFlagsCur;
    LONG lCurMotionXtoX;   // a
    LONG lCurMotionYtoX;   // b
    LONG lCurMotionXoffset;// c
    LONG lCurMotionXtoY;   // d
    LONG lCurMotionYtoY;   // e
    LONG lCurMotionYoffset;// f
    LONG lCurBlendCoef1;
    LONG lCurBlendCoef2;
    // second most recent input frame
    DWORD dwInputFlagsPrev;
    LONG lPrevMotionXtoX;   // a
    LONG lPrevMotionYtoX;   // b
    LONG lPrevMotionXoffset;// c
    LONG lPrevMotionXtoY;   // d
    LONG lPrevMotionYtoY;   // e
    LONG lPrevMotionYoffset;// f
    LONG lPrevBlendCoef1;
    LONG lPrevBlendCoef2;
} WMPhotoMotionSample;
#endif //_PHOTOMOTION_H_
```

Table 3 shows an alternative interface (based on the Microsoft DirectX Media Object ["DMO"] architecture) for communicating effect parameters to the encoder. It is a different way to pass the information corresponding to the frame header definition shown in Table 2. Essentially, the interface shown in Table 3 is an adaptation of the definition shown in Table 2 to the Microsoft DMO interface. In this implementation, the interface in Table 3 is implemented on top of the interface shown in Table 2.

Table 3 shows a structure WMPhotoMotionSample used to communicate effect parameters to the encoder. The structure is fed as part of an input media sample/buffer and describes how the upcoming frame should be produced. Every input sample passed to the encoder during encoding in this implementation contains this structure at the front of the buffer.

Turning to the details of Table 3, dwControlFlags is a set of flag values that describes what goes into the current output frame. The flags are defined as follows. SAMPLE_INPUT_FRAME indicates that the input sample contains an uncompressed frame immediately following the structure. SAMPLE_OUTPUT_FRAME indicates that an output (compressed) frame is being requested. The process involved in the composition of this frame is defined by the remaining members of this structure. SAMPLE_USES_CURRENT_INPUT_FRAME indicates that the output frame is going to be (at least in part) based on the most recent input frame. This flag is mandatory in the implementation. SAMPLE_USES_PREVIOUS_INPUT_FRAME indicates that the output frame is going to be (at least in part) based on the second most recent input frame.

The structure members with "Prev" and "Cur" in their names describe how each of the two most recent input frames is used in composing the output frame. The "Prev" members are only valid if the SAMPLE_USES_PREVIOUS_INPUT_FRAME flag described above is set. For each of the two input frames, dwinputFlags defines which parameters are specified for that frame—as Table 3 shows, which structure members are valid depends on which of these flags are set. Fewer than all parameters may be supported in a given implementation. For example, ROTATION and ADV_BLENDING may not be supported. The meaning of the parameters a, b, c, d, e, f are: an object at position (x,y) in the original frame gets put at position (a*x+b*y+c, d*x+e*y+f).

In this implementation, frames and effect parameters are provided to the encoder according to the following timing. The input frames (I-frames) are passed to the encoder as needed to generate output frames, and the effect parameters are passed for I-frames and P-frames. For example, suppose a first input frame is at time 0, a second input frame is at time 1, and the goal is to generate a fade between the two input frames. To do this, the encoder is passed the following information at the following times.

0.0 Default parameters+the first frame 0.1 Fade parameters (for 0.9 the first frame, 0.1 the second)+the second frame 0.2 Fade parameters (for 0.8 the first frame, 0.2 the second)+no frame 0.3 Fade parameters (for 0.7 the first frame, 0.3 the second)+no frame, etc.

Thus, the effect parameters are passed for every output frame that is generated, but an actual input video frame may only be present for some output frames.

The matrix operation shown in Table 4 is used to translate the parameters defined in Table 3 to equivalent (in terms of information content) but slightly different (in terms of interpretation) parameters used by

TABLE 4

Parameter conversions

```
CWMVideoObjectEncoder::EncodeSprite( ).
typedef struct {
    float a;
    float b;
    float c;
    float d;
    float e;
    float f;
} MotionCoef;
HRESULT InvertMotionCoefficients(MotionCoef* p) {
    float denom = p->a * p->e – p->b * p->d,
        c_num = p->b * p->f – p->c * p->e,
        f_num = p->d * p->c – p->f * p->a,
        old_a = p->a;
    if (denom == 0.0)
        return E_INVALIDARG;
    p->a = p->e / denom;
    p->e = old_a / denom;
    p->b = – p->b / denom;
    p->d = – p->d / denom;
    p->c = c_num / denom;
    p->f = f_num / denom;
    return NOERROR;
}
```

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of our invention may be applied, we claim as our invention all such embodiments as may come within the scope and spirit of the following claims and equivalents thereto.

The invention claimed is:

1. In an encoder, a computer-implemented method comprising:
    getting effect parameters for one or more synthesized images derived from one or more original still images;
    compressing the one or more original still images; and
    in a compressed bit stream, outputting the effect parameters and the one or more compressed original still images, thereby producing output for a sequence of vivid video comprising the one or more synthesized images so as to facilitate synthesis of the one or more synthesized images by a decoder with the effect parameters.

2. The method of claim 1 wherein the effect parameters include affine coefficients for panning, zooming, and/or rotation effects.

3. The method of claim 1 wherein the effect parameters include coefficients for fading or blending effects.

4. The method of claim 1 further comprising encoding the effect parameters to reduce the number of effect parameters that are output.

5. The method of claim 4 further comprising outputting one or more bits that indicate the number of effect parameters that are output for panning, zooming, and/or rotation effects.

6. The method of claim 4 further comprising outputting one or more bits that indicate whether the output includes effect parameters for fading or blending effects.

7. The method of claim 4 further comprising outputting one or more bits that indicate a number of sets of effect parameters for a given synthesized image of the one or more synthesized images, wherein each of the one or more original still images that contributes to the given synthesized image has a different set of effect parameters.

8. The method of claim 1 wherein at least one of the one or more synthesized images is derived from two of the one or more original still images.

9. The method of claim 1 further comprising combining the output with an audio track for the sequence of vivid video.

10. The method of claim 1 further comprising delivering the output by streaming, file transfer, or downloading.

11. The method of claim 1 wherein the getting the effect parameters comprises receiving user input exactly specifying the effect parameters.

12. The method of claim 1 wherein the getting the effect parameters comprises receiving information indicating the effect parameters from an application.

13. The method of claim 1 wherein the outputting comprises processing the one or more original still images as intra video frames and processing the one or more synthesized images as predicted video frames.

14. The method of claim 1 further comprising outputting first dimensions for the one or more original still images and second dimensions for a target view window area.

15. A computer-readable medium storing computer-executable instructions for causing the encoder to perform the method of claim 1.

16. An encoder comprising:
    an effect parametizer for getting effect parameters for one or more synthesized images, wherein the effect parameters include affine coefficients for panning, zooming, and/or rotation effects for at least one of the one or more synthesized images, and wherein the effect parameters further include fading coefficients for fading or blending effects for at least one of the one or more synthesized images;
    a still image compressor for compressing one or more original still images; and
    a multiplexer for outputting the effect parameters and the one or more compressed original still images.

17. The encoder of claim 16 wherein the effect parametizer reduces the number of effect parameters that are output.

18. The encoder of claim 16 wherein the multiplexer produces output in a compressed bit stream including the effect parameters and the one or more compressed original still images for a sequence of vivid video comprising the one or more synthesized images.

19. In a decoder, a computer-implemented method comprising:
    receiving output in a compressed bit stream for a sequence of vivid video comprising one or more synthesized images, the output including one or more compressed original still images and effect parameters for the one or more synthesized images;
    decompressing the one or more compressed original still images; and
    composing the one or more synthesized images based at least in part upon the effect parameters and the one or more decompressed original still images.

20. The method of claim 19 wherein the effect parameters include affine coefficients for panning, zooming, and/or rotation effects.

21. The method of claim 19 wherein the effect parameters include coefficients for fading or blending effects.

22. The method of claim 19 further comprising determining which of the effect parameters are included in the output based upon one or more bits in the output.

23. The method of claim 22 wherein the one or more bits indicate the number of effect parameters that are output for panning, zooming, and/or rotation effects.

24. The method of claim 22 wherein the one or more bits indicate whether the output includes effect parameters for fading or blending effects.

25. The method of claim 22 wherein the one or more bits indicate a number of sets of effect parameters for a given synthesized image of the one or more synthesized images, wherein each of the one or more original still images that contributes to the given synthesized image has a different set of effect parameters.

26. The method of claim 19 further comprising receiving first dimensions for the one or more original still images and second dimensions for a target view window area.

27. The method of claim 19 wherein the receiving comprises processing the one or more original still images as intra video frames and processing the one or more synthesized images as predicted video frames.

28. A computer-readable medium storing computer-executable instructions for causing the decoder to perform the method of claim 19.

29. A decoder comprising:
a demultiplexer for receiving one or more compressed original still images and effect parameters;
a still image decompressor for decompressing the one or more compressed original still images;
one or more transformers for computing one or more component images for each of one or more synthesized images based upon the one or more decompressed original still images and the effect parameters; and
a blender for combining the one or more component images for each of the one or more synthesized images.

30. The decoder of claim 29 wherein the effect parameters include affine coefficients for panning, zooming, and/or rotation effects, and wherein the one or more transformers apply the affine coefficients during the computing the one or more component images.

31. The decoder of claim 29 wherein the effect parameters include coefficients for fading or blending effects, and wherein the blender applies the coefficients during the combining.

32. The decoder of claim 29 wherein the demultiplexer receives output in a compressed bit stream including the effect parameters and the one or more compressed original still images for a sequence of vivid video comprising the one or more synthesized images.

33. In a computer system, a method comprising:
for each of one or more output frames,
providing a header structure for the output frame to an encoder, wherein the header structure includes:
a set of control flags for the output frame, wherein the control flags give indications including (a) presence or absence of image data for an I-frame used for the output frame and (b) which of up to two I-frames to use for the output frame;
up to two sets of input flags for the output frame, wherein the input flags give indications including presence or absence of effect parameters to use for the output frame;
up to two sets of effect parameters for the output frame, wherein each of the two sets of effect parameters is to be applied to a different I-frame, and wherein members present in each of the two sets of effect parameters are indicated in a corresponding one of the sets of input flags for the output frame;
if the set of control flags for the output frame indicates the presence of image data, providing the image data.

34. A computer-readable medium storing computer-executable instructions for causing the computer system to perform the method of claim 33.

35. In a decoder, a computer-implemented method comprising:
receiving output for a sequence of vivid video comprising one or more synthesized images, the output including one or more compressed original still images and effect parameters for the one or more synthesized images;
decompressing the one or more compressed original still images; and
composing the one or more synthesized images based at least in part upon the effect parameters and the one or more decompressed original still images;
wherein the composing comprises computing a first component image based upon first transform parameters of the effect parameters and a first one of the one or more decompressed original still images.

36. The method of claim 35 wherein the composing further comprises:
computing a second component image based upon second transform parameters of the effect parameters and a second one of the one or more decompressed original still images; and
blending the first and second component images according to blending parameters of the effect parameters.

37. In a decoder, a computer-implemented method comprising:
receiving output for a sequence of vivid video comprising one or more synthesized images, the output including one or mare compressed original still images and effect parameters for the one or more synthesized images;
decompressing the one or more compressed original still images;
composing the one or more synthesized images based at least in part upon the effect parameters and the one or more decompressed original still images; and
buffering up to n of the one or more decompressed original still images, wherein the oldest one of the one or more decompressed original still images is discarded as necessary for the newest one of the decompressed original still images.

38. The method of claim 37 wherein n is two.

* * * * *

UNITED STATES PATENT AND TRADEMARK OFFICE
CERTIFICATE OF CORRECTION

| | | |
|---|---|---|
| PATENT NO. | : 7,421,129 B2 | Page 1 of 1 |
| APPLICATION NO. | : 10/656301 | |
| DATED | : September 2, 2008 | |
| INVENTOR(S) | : Ming-Chieh Lee et al. | |

It is certified that error appears in the above-identified patent and that said Letters Patent is hereby corrected as shown below:

In column 18, line 47, in Claim 37, delete "mare" and insert -- more --, therefor.

Signed and Sealed this
Tenth Day of May, 2011

David J. Kappos
*Director of the United States Patent and Trademark Office*